(12) United States Patent
Lapp et al.

(10) Patent No.: US 10,694,665 B2
(45) Date of Patent: Jun. 30, 2020

(54) CUTTER-DECK LEVELING FINE ADJUSTMENT

(71) Applicant: Schiller Grounds Care, Inc., Southampton, PA (US)

(72) Inventors: Jonathan Lapp, Johnson Creek, WI (US); Chapin C. Nault, Madison, WI (US)

(73) Assignee: Clark Equipment Company, West Fargo, ND (US)

( * ) Notice: Subject to any disclaimer, the term of this patent is extended or adjusted under 35 U.S.C. 154(b) by 375 days.

(21) Appl. No.: 15/842,329

(22) Filed: Dec. 14, 2017

(65) Prior Publication Data

US 2019/0183043 A1     Jun. 20, 2019

(51) Int. Cl.
*A01D 34/00*       (2006.01)
*A01D 34/74*       (2006.01)

(52) U.S. Cl.
CPC .................................. *A01D 34/74* (2013.01)

(58) Field of Classification Search
CPC ..................................................... A01D 34/74
USPC ....................................................... 56/17.1
See application file for complete search history.

(56) References Cited

U.S. PATENT DOCUMENTS

| | | | |
|---|---|---|---|
| 2,142,295 A | 1/1939 | Willford | |
| 2,513,309 A | 7/1950 | Grobowski | |
| 2,924,055 A | 2/1960 | Clemson | |
| 3,040,830 A * | 6/1962 | Lamprecht | A01D 34/74 56/10.8 |
| 3,176,454 A * | 4/1965 | Jepson | A01D 34/42 56/249 |
| 3,795,094 A * | 3/1974 | Mollen | A01D 34/64 56/11.1 |
| 4,321,784 A * | 3/1982 | Wood | A01D 34/74 280/43.13 |
| 5,085,044 A | 2/1992 | Freier, Jr. et al. | |
| 5,203,151 A | 4/1993 | Mills | |
| 5,241,810 A | 9/1993 | Reichen | |
| 6,347,502 B1 | 2/2002 | deVries | |
| 6,651,415 B2 | 11/2003 | Burke | |
| 7,197,863 B1 * | 4/2007 | Sugden | A01D 34/66 56/15.8 |
| 7,395,648 B1 | 7/2008 | Silbemagel et al. | |
| 7,520,114 B2 * | 4/2009 | Bergsten | A01D 42/08 56/14.7 |
| 7,624,560 B1 | 12/2009 | Humphrey | |
| 7,716,907 B2 * | 5/2010 | Joliff | A01D 34/74 56/17.2 |
| 7,775,025 B1 | 8/2010 | Coffin et al. | |

(Continued)

*Primary Examiner* — Thomas B Will
*Assistant Examiner* — Mai T Nguyen
(74) *Attorney, Agent, or Firm* — Panitch Schwarze Belisario & Nadel LLP

(57) ABSTRACT

A cutter-deck leveling fine adjustment is for a lift assembly from which a lawn mower cutter deck is suspended, the lift assembly enabling coarse height adjustment of the cutter deck. The fine adjustment includes a lift-assembly support. A vertically elongated slot extends entirely through the lift-assembly support. A linear arrangement of gear teeth is adjacent the slot. A shaft is slideably and rotateably disposed in the slot. A gear is on the shaft and is meshed with the arrangement of gear teeth. A link connects the shaft to the cutter deck. Rotation of the gear moves the cutter deck in vertical translatory motion.

7 Claims, 3 Drawing Sheets

(56) References Cited

U.S. PATENT DOCUMENTS

| | | |
|---|---|---|
| 8,001,754 B2 | 8/2011 | Michel |
| 8,371,095 B2 | 2/2013 | Grewe et al. |
| 8,387,350 B2 | 3/2013 | Slater et al. |
| 2005/0016143 A1* | 1/2005 | Thatcher ................ A01D 34/74 56/15.6 |
| 2006/0090442 A1* | 5/2006 | Komiya ................. A01D 34/74 56/14.7 |
| 2007/0039304 A1* | 2/2007 | Wright .................. A01D 34/74 56/14.9 |
| 2007/0062170 A1 | 3/2007 | Finkner |
| 2010/0102525 A1* | 4/2010 | Fancher, III ........... A01D 34/74 280/43.17 |
| 2014/0083069 A1* | 3/2014 | Berglund ............... A01D 34/82 56/14.7 |
| 2018/0209516 A1* | 7/2018 | Lapp ...................... F16H 7/129 |

* cited by examiner

CUTTER-DECK LEVELING FINE ADJUSTMENT

BACKGROUND OF THE INVENTION

The present invention relates to a mechanism for adjusting the height of cut for the cutter deck of a conventional riding lawn mower. More particularly, the present invention relates to a cutter deck leveling fine adjustment mechanism for a riding lawn mower.

Conventional lawn mowers include a suspended cutter deck that is height adjustable to adjust deck cutting height. Typically, the cutter deck is suspended from a cutter deck support assembly having a rear-deck lift assembly with a coarse lift adjustment mechanism and a front-deck lift assembly also having a coarse lift adjustment mechanism. The rear-deck assembly and the front-deck lift assembly have a bar extending horizontally across the top of the cutter deck. Each bar is supported by a portion of the lawn mower frame above the deck. At each end of each bar, a radially outwardly extending bracket is rotationally fixed thereto. A chain bolted at a top end to each bracket extends downwardly and is bolted at a lower end to the cutter deck, roughly at the four corners of the deck.

The rear-deck and front-deck lift assemblies are operatively connected via a linkage providing a coordinated pivoting movement of the brackets upwardly and downwardly in response to the movement of a handle and foot pedal raising or lowering the height of all four corners of the cutter deck in coarse simultaneous quarter-inch incremental adjustments. In addition to the coarse simultaneous adjustment of the height of the cutter deck, a user may desire to more finely adjust the suspended deck, for example, at individual corners of the deck, to more finely adjust the leveling of the deck.

Accordingly, in addition to coarse adjustment of the height of a cutter deck, there is a need in the art for a fine adjustment mechanism for leveling the height of a cutter deck.

BRIEF SUMMARY OF THE INVENTION

Briefly stated, one embodiment of the present invention is directed to a cutter-deck leveling fine adjustment for a cutter-deck lift assembly from which a lawn mower cutter deck is suspended, the cutter-deck lift assembly enabling coarse height adjustment of the cutter deck. The fine adjustment includes a lift assembly support. A slot extends entirely through the lift assembly support. A linear arrangement of gear teeth is adjacent the slot. A shaft is slideably and rotateably disposed in the slot. A gear is on the shaft and is meshed with the arrangement of gear teeth. A link connects the shaft to the cutter deck. Rotation of the gear moves the cutter deck in translatory motion.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, the drawings show embodiments which are presently preferred. It should be understood, however, that the invention is not limited to the precise arrangements and instrumentalities shown.

In the drawings.

DETAILED DESCRIPTION OF THE INVENTION

Figure 1:
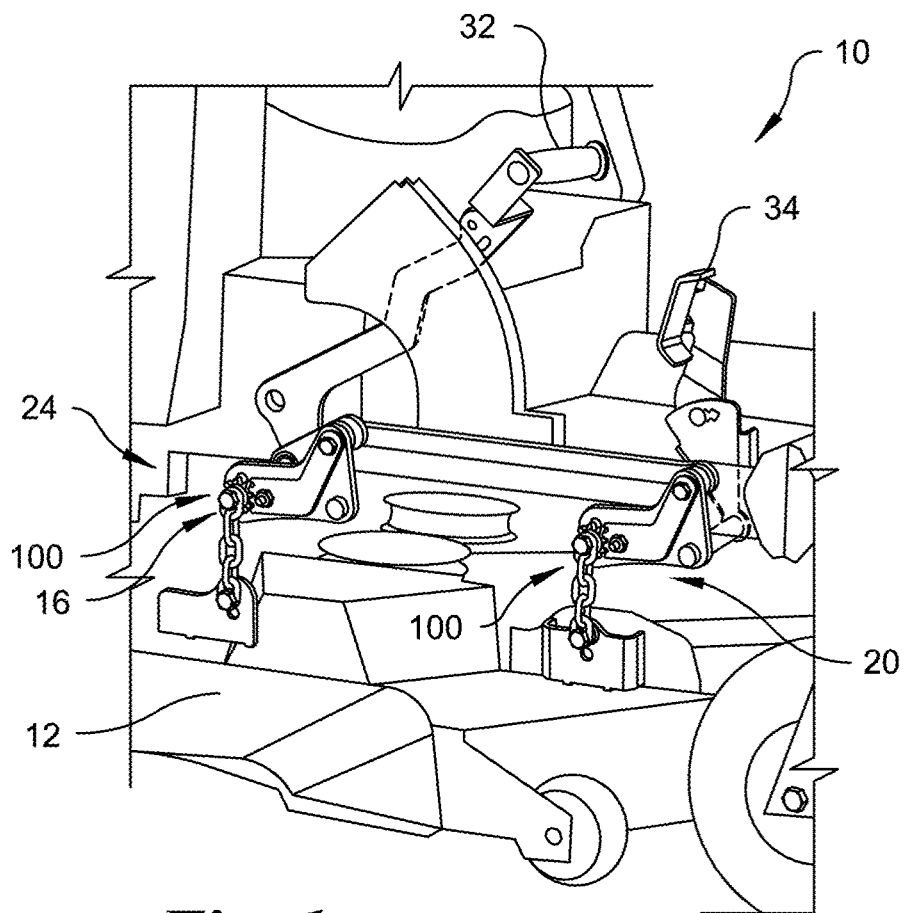
FIG. 1 is a right side perspective elevation view of a portion of a conventional riding lawn mower having a first preferred embodiment of the cutter-deck leveling fine adjustment in accordance with the present invention.

Reference will now be made in detail to embodiments of the invention, examples of which are illustrated in the accompanying drawings. The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise. The words "and/or" as used herein refers to and encompasses any and all possible combinations of one or more of the associated listed items. The words "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The words "right," "left," "lower" and "upper" designate directions in the drawings to which reference is made. The words "inwardly" and "outwardly" refer to directions toward and away from, respectively, the geometric center of the cutter deck leveling fine adjustment, and designated parts thereof. The terminology includes the words noted above, derivatives thereof and words of similar import.

Although the words first, second, etc., are used herein to describe various elements, these elements should not be limited by these words. These words are only used to distinguish one element from another. For example, a first nut could be termed a second nut, and, similarly, a second nut could be termed a first nut, without departing from the scope of the present invention.

The following description is directed towards various embodiments of a cutter-deck leveling fine adjustment in accordance with the present invention.

Referring to the drawings in detail, where like numerals indicate like elements throughout, there is shown in FIGS. 1-5 a first preferred embodiment of the cutter-deck leveling fine adjustment, generally designated 100, and hereinafter referred to as the "leveling fine adjustment" 100 in accordance with the present invention. The leveling fine adjustment 100 is for use with a cutter-deck support assembly 14 from which a cutter deck 12 of a lawn mower 10 is suspended. The cutter-deck support assembly 14 enables coarse height adjustment of the cutter deck 12 and comprises a rear-deck lift assembly 16 with a coarse lift adjustment mechanism 18 and a front-deck lift assembly 20 also having the coarse lift adjustment mechanism 18. The each of the rear-deck and front-deck lift assemblies 16, 20 has a lift-assembly bar 22 extending horizontally across the top of the cutter deck 12. Each lift-assembly bar 22 is supported by a portion of the lawn mower frame 24 above the cutter deck 12. At each end of each lift-assembly bar 22, a radially outwardly extending lift-assembly support 26 is rotationally fixed thereto. Preferably, the lift-assembly support 26 is a metal plate having a generally rectangular shape with the location at which the lift-assembly support 26 is attached to the lift-assembly bar 22 being offset from the rotational center of the plate 26. In some embodiments, the lift-assembly support 26 may have a dog-leg-like shape to provide more leverage for lifting the cutter deck 12 when the lift-assembly bars 22 to which the lift-assembly supports are attached are rotated. A chain 28 bolted at a top end to each lift-assembly support 26 extends downwardly and is bolted at a lower end to bracket extending upwardly from the cutter deck 12, roughly at the four corners of the cutter deck 12.

Figure 2:
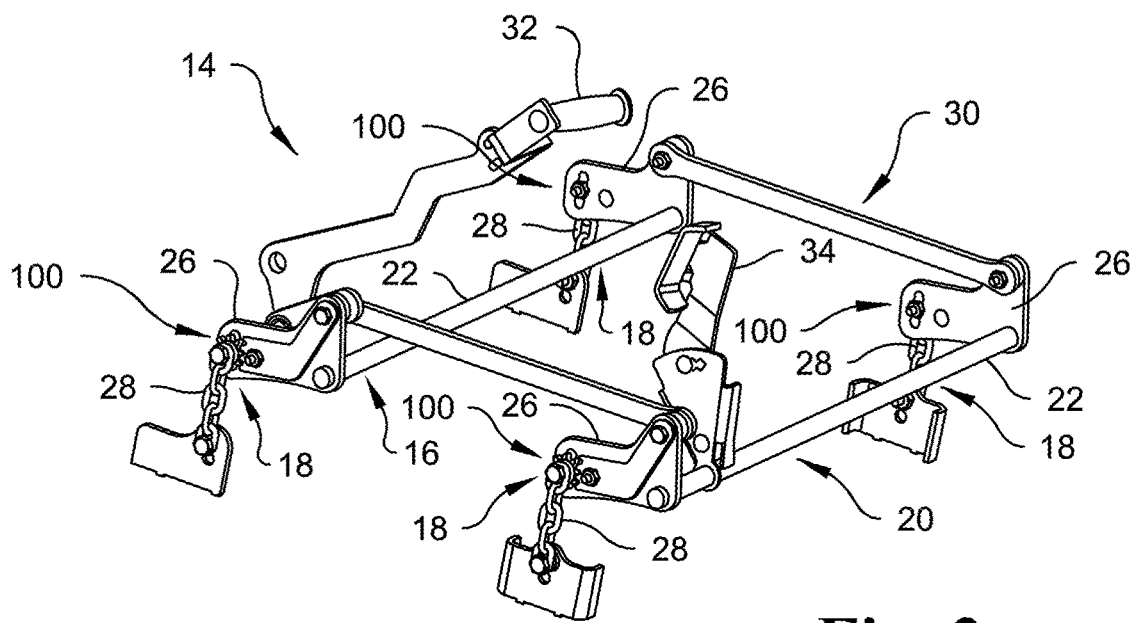
FIG. 2 is a right-side top perspective view of the deck lift assembly of FIG. 1 including multiple instances of the cutter-deck leveling fine adjustment in accordance with the present invention.

Referring to FIG. 2, the rear-deck and front-deck lift assemblies 16, 20 are operatively connected via a linkage 30 providing a coordinated pivoting movement of the lift-assembly supports 26 upwardly and downwardly in response to the movement of a handle 32 and foot pedal 34 raising or lowering the height of all four corners of the cutter deck 12 in coarse simultaneous incremental adjustment, preferably in about quarter-inch increments. In some embodiments, the adjustment may be greater than or less than a quarter-inch increment.

Figure 3:
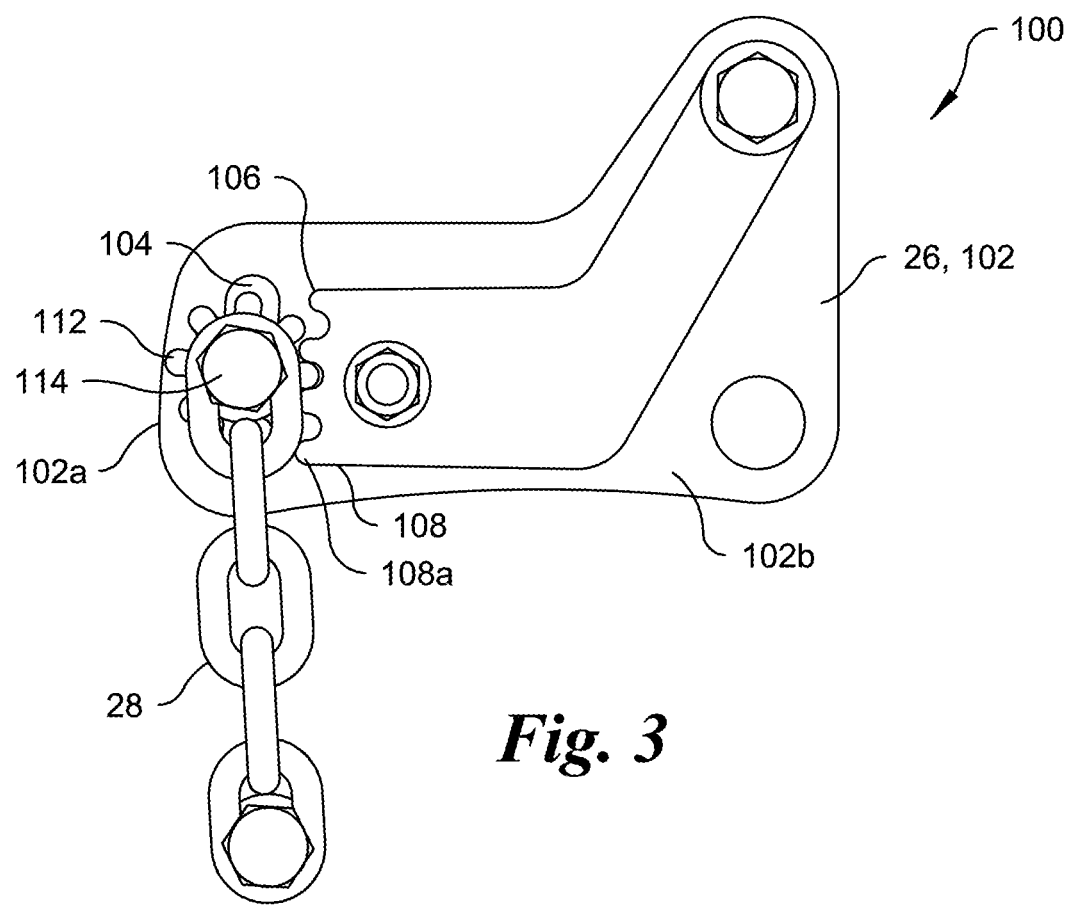
FIG. 3 is a side elevation view of the cutter-deck leveling fine adjustment of FIG. 1.
Figure 4:
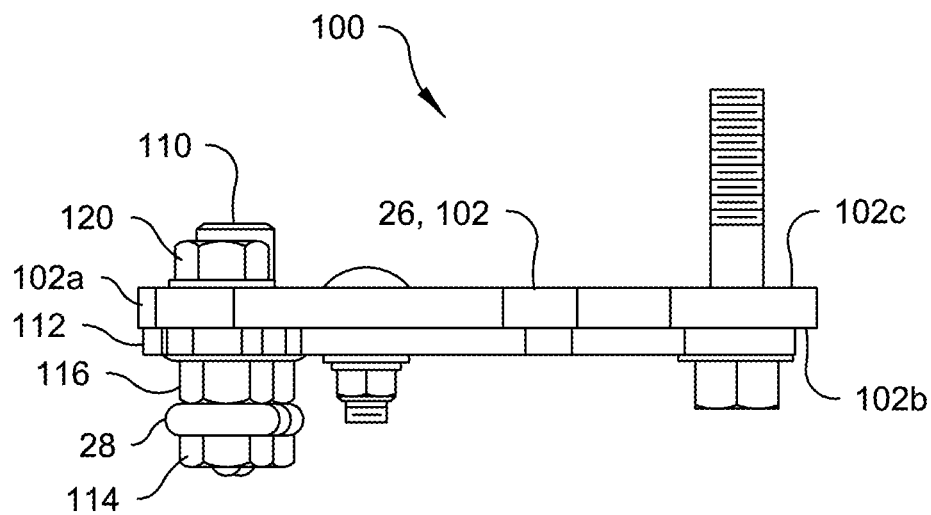
FIG. 4 is a top plan view of the cutter-deck leveling fine adjustment of FIG. 3.
Figure 5:
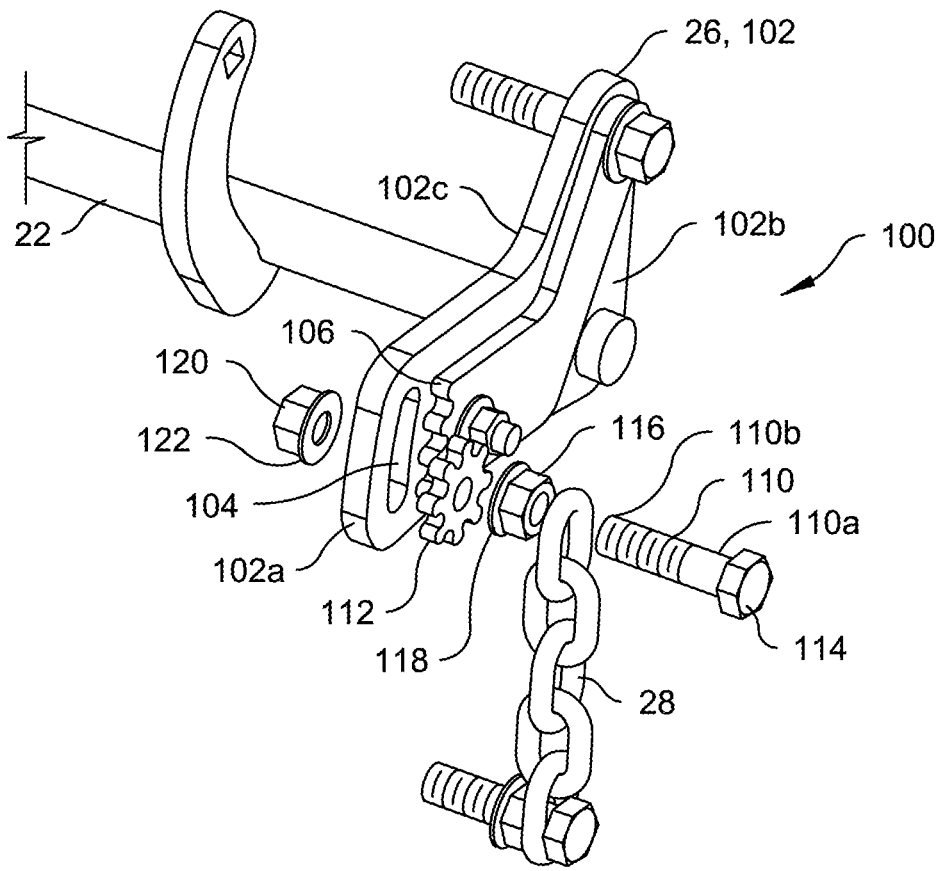
FIG. 5 is an exploded perspective view of the right-side cutter-deck leveling fine adjustment portion of the rear-deck lift assembly of FIG. 2.

Referring to FIGS. 3-5, the leveling fine adjustment 100 comprises one lift-assembly support 102 of the plurality of cutter-deck lift-assembly supports 26 rotatably attached to the end of one of the lift-assembly bars 22 comprising a portion of the rear-deck and front-deck lift assemblies 16, 20. Preferably, the lift-assembly support 102 is a metal plate having a generally rectangular shape with the location at which the lift-assembly support 102 is attached to the lift-assembly bar 22 being offset from the rotational center of the lift-assembly support 102. In some embodiments, the lift-assembly support 102 may have a dog-leg-like shape to provide more leverage for lifting the cutter deck 12 when the lift-assembly bar 22 to which the lift-assembly support 102 is rotated.

An elongated slot 104 extends entirely through the lift-assembly support 102. Preferably, but not necessarily, the slot is vertically oriented. In some embodiments, the slot 104 is proximal a first edge 102a of the lift-assembly support 102 and a linear arrangement of gear teeth 106 is adjacent the elongated slot 104. Preferably, the linear arrangement of gear teeth 106 forms a side 108a of a rack 108 fixedly attached to the lift-assembly support 102. Alternatively, in some embodiments, the linear arrangement of gear teeth may be formed at the edge of another plate positioned adjacent the elongated slot 104 and fixedly attached to the lift-assembly support 102 by fasteners such as a bolt or weld or being formed together with the lift-assembly support 102 in a casting process.

A shaft 110 is slideably and rotateably disposed in the elongated slot 104. A gear 112, preferably a pinion gear, is on the shaft 110 and is meshed with the arrangement of gear teeth 106. In some embodiments, the gear 112 may be fixedly attached to the shaft 110 for rotation therewith. Preferably, the shaft 110 is threaded. One end 110a of the shaft 110 extending beyond one side 102b of the lift-assembly support 102 terminates in a bolt head 114. A first nut 116 with a first nut flange 118 is threadedly attached to the one end 110a of the shaft 110. The gear 112 is between the first nut flange 118 and the one side 102b of the lift-assembly support 102. Preferably, first nut 116, the first nut flange 118 and the gear 112 are fabricated as a single part. In some embodiments, a surface of the first nut flange 118 facing the gear 112 may be serrated. An other end 110b of the shaft 110 extending beyond an other side 102c of the lift-assembly support 102 has a second nut 120 with a second nut flange 122 threadedly attached thereto.

A link 124 connects the shaft 110 to the cutter deck 12. Preferably, the link 124 is a chain having one end attached to the cutter deck 12 and the other end rotatably attached to the shaft 110 between the bolt head 114 and the first nut 116.

Leveling fine adjustment of the cutter deck 12 may be achieved by performing the following procedure on four leveling fine adjustments 100, each of which is positioned roughly at one of the four corners of the cutter deck 12.

Gear 112 may be releasably retained at any vertical position in the elongated slot 104 by applying a tightening torque to the first and second nuts 116, 120 when the shaft 110 is in a desired position in the elongated slot 104. Since rotation of the gear 112 moves the shaft 110, and therefore the cutter deck 12 attached thereto, in vertical translatory motion in the elongated slot 104, the position of the shaft 110 may be changed by applying a loosening torque to the first and second nuts 116, 120 until the gear 112 is free to rotate. Thereafter a rotation of the gear 112 cases upward or downward translatory motion along the linear arrangement of gear teeth 106 thereby raising or lowering a corresponding corner of the cutter deck 12 to another desired leveling position. The shaft 110 may be releasably retained in the new position by applying a tightening torque to the first and second nuts 116, 120.

In some embodiments where the gear 112 is fixedly attached to the shaft 110, the torque to loosen or tighten the leveling fine adjustment 100 may be applied to the bolt head 114 and the second nut 120 and the gear 112 may be rotated by the torque applied to the bolt head 114.

The foregoing detailed description of the invention has been disclosed with reference to specific embodiments. However, the disclosure is not intended to be exhaustive or to limit the invention to the precise forms disclosed. Those skilled in the art will appreciate that changes could be made to the embodiments described above without departing from the broad inventive concept thereof. Therefore, the disclosure is intended to cover modifications within the spirit and scope of the present invention as defined by the appended claims.

All references, patent applications, and patents mentioned above are incorporated herein by reference in their entirety and are not to be construed as an admission that any of the cited documents constitutes prior art, or as an admission against interest in any manner.

We claim:

1. A cutter-deck leveling fine adjustment for a cutter-deck lift assembly from which a lawn mower cutter deck is suspended, the cutter-deck lift assembly having a plurality of cutter-deck lift assembly supports enabling coarse height adjustment of the cutter deck, the cutter-deck leveling fine adjustment comprising:

a lift-assembly support of the plurality of cutter-deck lift assembly supports;
   an elongated slot entirely through the lift-assembly support;
   a linear arrangement of gear teeth adjacent the slot;
   a shaft slideably and rotateably disposed in the slot;
   a gear on the shaft and meshed with the arrangement of gear teeth; and
   a link connecting the shaft to the cutter deck, wherein rotation of the gear moves the cutter deck in translatory motion.

2. The cutter-deck leveling fine adjustment according to claim 1, wherein:
the lift-assembly support is a plate,
the elongated slot is proximal a first edge of the plate,
the linear arrangement of teeth forms a side of a rack fixedly attached to the support, and
the gear is a pinion gear.

3. The cutter-deck leveling fine adjustment according to claim 1, wherein the shaft is threaded, one end of the shaft extending beyond one side of the lift-assembly support terminates in a bolt head, a first nut with a first nut flange is threadedly attached to the one end of the shaft, the gear is between the first nut flange and the one side of the lift-assembly support, and an other end of the shaft extending beyond an other side of the lift-assembly support has a second nut with a second nut flange threadedly attached thereto.

4. The cutter-deck leveling fine adjustment according to claim 3, wherein the link is a chain having one end attached to the cutter deck and the other end rotatably attached to shaft between the bolt head and the first nut.

5. The cutter-deck leveling fine adjustment according to claim 3, wherein the first nut, the first nut flange and the gear are fabricated as a single part.

6. The cutter-deck leveling fine adjustment according to claim 3, wherein a surface of the first nut flange facing the gear is serrated.

7. The cutter-deck leveling fine adjustment according to claim 3, wherein the gear is fixedly attached to the shaft for rotation therewith.

\* \* \* \* \*